Oct. 17, 1950 R. L. GARMAN ET AL 2,525,891

TELEVISION RECORDING OR TRANSMITTING APPARATUS USING CONSTANT SPEED FILM

Filed July 17, 1947 5 Sheets-Sheet 1

Inventors
RAYMOND L. GARMAN
FRANK N. GILLETTE

By J. B. Bayer
H. S. Mackey
Attorney

Inventors
RAYMOND L. GARMAN
FRANK N. GILLETTE
By
[signature]
Attorney

Inventors
RAYMOND L. GARMAN
FRANK N. GILLETTE
By
Attorney

Inventors
RAYMOND L. GARMAN
FRANK N. GILLETTE
By
Attorney

Oct. 17, 1950

R. L. GARMAN ET AL
TELEVISION RECORDING OR TRANSMITTING
APPARATUS USING CONSTANT SPEED FILM 2,525,891

Filed July 17, 1947

5 Sheets-Sheet 5

Inventors
RAYMOND L. GARMAN
FRANK N. GILLETTE

By

Attorney

Patented Oct. 17, 1950

2,525,891

UNITED STATES PATENT OFFICE 2,525,891

TELEVISION RECORDING OR TRANSMITTING APPARATUS USING CONSTANT SPEED FILM

Raymond L. Garman and Frank N. Gillette, Pleasantville, N. Y., assignors to General Precision Laboratory Incorporated, a corporation of New York Application July 17, 1947, Serial No. 761,493

16 Claims. (Cl. 178—6.7)

This invention relates to television recording and transmission apparatus and more particularly to apparatus whereby received television images are recorded on film for projection by standard motion picture projectors and whereby motion picture images recorded on standard motion picture film are converted to television signals which may in turn be transmitted and received in the usual manner.

In the United States, television signals are transmitted at a standard frequency of 30 frames or complete picture repetitions a second. Ordinarily interlaced scanning is employed so that each frame is composed of two vertical sweeps or scans, alternate lines being scanned during each vertical sweep or deflection cycle. This results in the field of the picture being covered twice for each frame or complete picture and hence the frequency at which the field is covered is twice that of the frame frequency or 60 cycles per second.

In standard practice, motion pictures are recorded and projected at the rate of 24 frames a second. In order, therefore, that television images transmitted under the usual standards may be recorded so that they may in turn be projected by standard projectors and conversely motion pictures recorded on standard film may be transmitted and received on standard television apparatus, it is necessary to provide some means by which the 60 cycle television fields may be converted to 24 cycle picture frames and vice versa. This is one of the purposes of the instant invention.

In the present invention the conversion from television images to photographic images is accomplished by projecting the television image formed on the screen of a cathode ray tube onto a strip of continuously moving motion picture film. The conversion of 60 television fields a second to 24 picture frames a second is accomplished by exposing a single frame of the photographic film to more than a single television field scan and the motion of the film with respect to the cathode ray tube is effectively eliminated by suitable alteration of the scanning pattern of the cathode ray tube so that the film despite its movement receives a normal picture pattern.

Since it is expected that the film record produced from the television image is to be projected by standard means, it is essential that the picture frames be placed on the film strip in proper relation to the sprocket holes on the edges of the film. If these picture frames are not so placed, there will result a constant fluctuation in framing, making the film strip wholly unsuitable for projection purposes. In 16 mm. film, for example, in order to provide proper projection the frame placement with respect to the sprocket holes of the film must be accurate to ±.025 inch.

A particular feature of the present invention, therefore, resides in the provision of means for obtaining accurate placement of the picture images on the film with respect to the sprocket holes and for assuring that such accuracy of placement is maintained throughout the period of recording. To this end the present invention provides a novel means for synchronizing the motion of the film with the television system. Briefly stated this consists of a monitoring display which indicates by suitable graphic means the phase and frequency relationship between the film feeding means and the television scanning means.

To accomplish the purpose of converting motion picture images to television signals, the present invention provides means for scanning a continuously moving film with a light of constant intensity. The light is transmitted thru the film having standard motion picture frames thereon and is caused to impinge upon a photo-electric device which produces a television video signal that may be transmitted in the normal way.

As before stated, in order to realize this conversion, it is necessary to translate 24 picture frames per second to 60 television scans a second. In the instant invention such translation is accomplished by alternately obtaining 3 television scans from one picture frame and 2 television scans from the next succeeding frame. Again as in the case of the production of motion picture images from television images, the continuous movement of the film is effectively eliminated by suitably altering the scanning pattern.

Likewise, it is essential that the proper phase and frequency relationships be maintained between the motion of the film and the scanning means therefor and in the instant invention this is accomplished by the use of novel monitoring means such as referred to above.

The invention will be better understood from the following description taken in connection with the accompanying drawings, in which.

Figure 1:
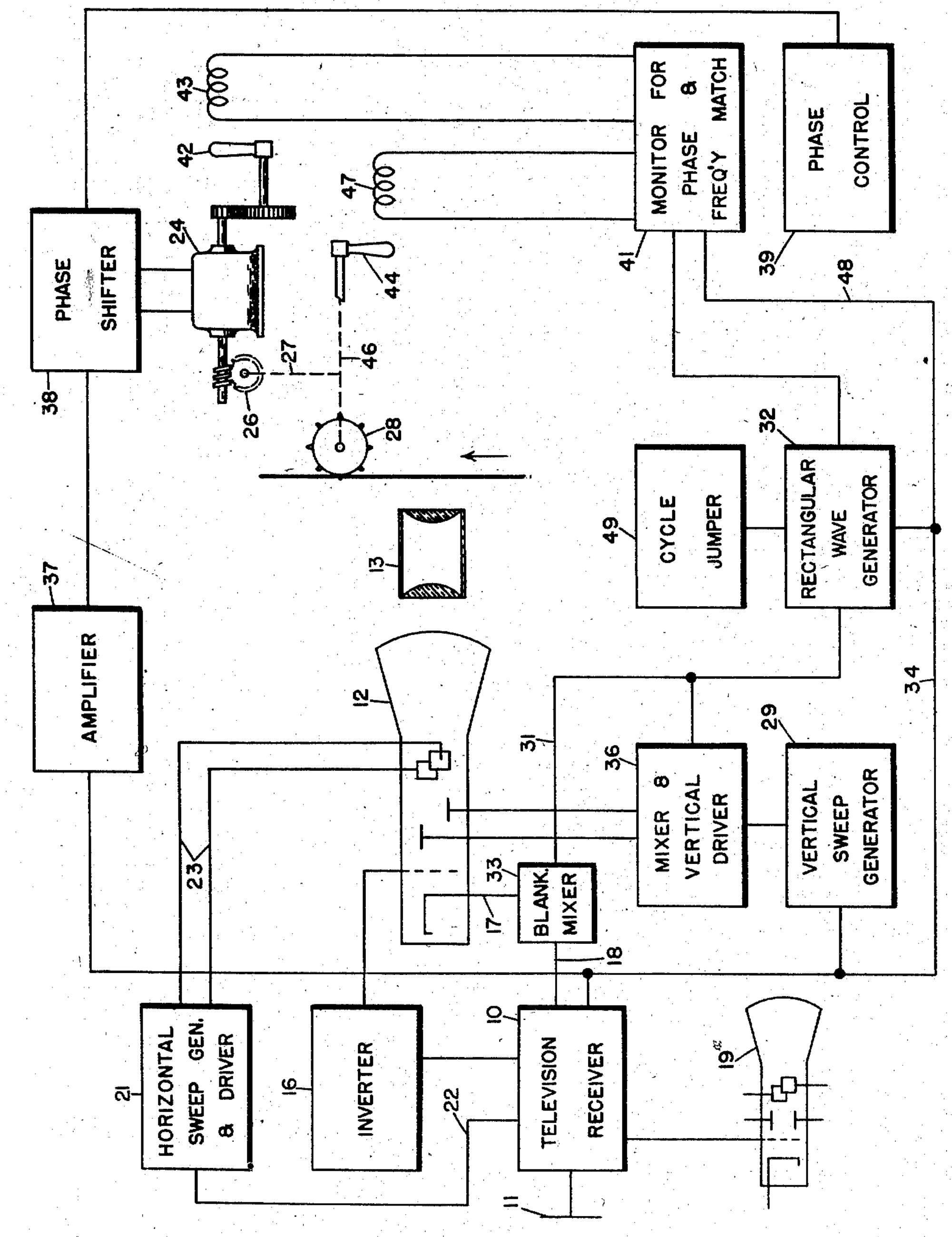
Fig. 1 is a diagrammatic view of a complete system for recording television images on motion picture film.

Referring now to the drawings and particularly to Fig. 1 thereof, a television recording apparatus is shown in which the received television signals are impressed on a television receiver 10 thru the medium of an antenna 11. The television receiver 10 may be of the standard type used for home receiving purposes having synchronizing signal separating means.

The receiver selects and rectifies the telvision signal and produces as a result of such rectification varying picture signals which picture signals are applied to the control electrode of a cathode ray tube 12 in the usual manner. The picture image formed on the screen of the cathode ray tube 12 is projected thru a suitable lens system 13 on a continuously moving film 14 which may be immediately developed by any of the quick development processes and projected on a motion picture screen or may be stored for future reference.

If immediate development and projection is desired, it is necessary that a positive picture print be produced directly from the picture image appearing on the face of the cathode ray tube 12 and hence the polarity of this picture image must be reversed. This is accomplished by transmitting the positive picture signal derived from the receiver 10 to an inverter 16, which may consist of a single stage of amplification, before impressing it on the control electrode of the cathode ray tube 12. There is impressed upon the control electrode of the cathode ray tube 12, therefore, a signal whose wave form is opposite in polarity to the conventional wave form and negative images are produced on the screen of the tube 12. This reversal of the signal wave form, beside reversing the picture intensities and yielding a negative image also reverses the synchronizing signals which normally determine black for the picture and would result in white return lines appearing on the screen of tube 12. In order that the appearance of such lines may be prevented a blocking signal derived from the synchronizing signals is impressed on the cathode 17 of tube 12 thru conductor 18, thereby blanking the screen of the cathode ray tube during the return period.

For checking the performance of the receiver at the exact instant the signals are being received, a monitor tube 19 is connected in the usual manner to the receiver 10 to produce a positive image and to indicate to the operator that reception is taking place and that suitable video, synchronizing and blanking signals are being developed by the receiver.

In order that the cathode ray beam may be scanned across the screen of the tube 12 to provide a picture image having both height and width, horizontal and vertical sweep generators and drivers are provided connected to the appropriate deflection means of the cathode ray tube. The horizontal sweep generator and driver 21 is of conventional construction, generating a saw-tooth wave form from synchronizing signals derived from the receiver 10 by means of connection 22. The saw-tooth wave so generated is in turn applied to the horizontal deflection means of the cathode ray tube 12 thru connections 23 resulting in the horizontal scanning of the cathode ray beam.

As heretofore stated the present invention contemplates projecting the image formed on the screen of the cathode ray tube on a strip of continuously moving film to provide standard motion picture images. In order that the picture images may be properly recorded on such a film strip in proper relation to each other and of the proper frequency for projection by standard motion picture projectors, the present invention provides a particular and distinctive vertical sweep generator and driver circuit.

The motor 24, powered by means to be more fully described hereinafter, continuously advances the film strip 14 in an upward direction thru the medium of worm gear 26, shaft 27 and sprocket 28. In order that discrete picture frames may be properly placed on this strip the continuous motion of the film is effectively canceled by a compression or reduction of the amplitude of the vertical sweep. Assuming that motion pictures of the standard 24 frame system are desired and that the television signals are received at the standard rate of 60 scans or fields a second, in the $\frac{1}{60}$ of a second that the vertical scan is moving downward on the face of the cathode ray tube for one field, the film strip is moving upwardly $\frac{2}{5}$ of a frame. In the present invention, this relative motion between film strip and cathode ray tube screen is canceled by reducing the amplitude of the vertical sweep generator 29 to $\frac{3}{5}$ that of normal, thus a single picture frame on the picture strip 14 is scanned by the downward movement of the vertical scan a distance corresponding to $\frac{3}{5}$ of a frame, while at the same time the film itself is moving upwardly the remaining distance or $\frac{2}{5}$ of a frame.

This compression of the vertical sweep while cancelling the effect of the motion of the film when considering merely the projection of one television scan on a single motion picture frame does not alone compensate for the motion of the film for a succession of frames. Because it is desired to translate television images occurring at the rate of 60 per second to motion picture frames to be projected at the rate of 24 a second, more than one television scan must be projected on the same picture frame. As before stated during the time it takes for one television scan to be completed the film strip has moved upwardly a distance equal to $\frac{2}{5}$ of a frame height. If, therefore, it is desired to project the next television scan on the same picture frame, it is necessary that the vertical scan of the cathode ray tube start at a point $\frac{2}{5}$ of a frame higher than the scan started initially. During this second scan the film again advances a distance equal to $\frac{2}{5}$ of a frame and if it is now desired to project the third television scan on the next succeeding frame of the picture strip it is necessary to begin the vertical scan at a point $\frac{1}{5}$ of a frame below that of the initial scan, the film having advanced a total of $\frac{4}{5}$ of a frame during the time required for the first two scans.

While the third scan is taking place, the film strip is once more advancing a distance equal to ⅖ of a frame and if it is desired to project the fourth television scan on the second picture frame, it is necessary to begin this scan at a point ⅕ of a frame higher than the initial scan, the film having advanced $^6/_5$ of a frame during the first three scans thus placing the leading edge of the second frame ⅕ of a frame above the point where the scanning sequence began.

Figure 4:
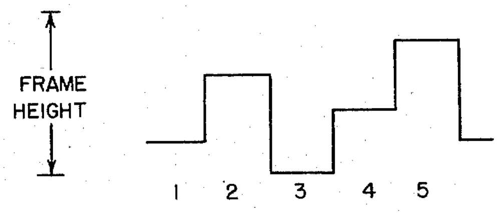
Fig. 4 is a diagram illustrating the form of the wave produced by the rectangular wave generator of Fig. 3.

In Fig. 4 there is shown diagrammatically the various levels at which the vertical scan must be initiated with respect to the height of a single frame. In this illustration five television scans are depicted by the levels indicated by the numbers 1 to 5 inclusive since the ratio of 60 television scans per second converted to 24 picture frames a second naturally follows the ratio of 5 to 2. If, however, this ratio were maintained by projecting two television scans on the first picture frame and three on the second unequal picture intensities would result because of the unequal light intensities received by successive frames.

In the present invention this disadvantage is avoided by omitting each fifth television scan. The rectangular wave generator 32 is operated to generate a signal at each fifth scan which is impressed on the control electrodes of the cathode ray tube 12 thru the connection 31 and blanking mixer 33, thereby cutting off the cathode ray beam during this period In order to produce a wave of the form shown in Fig. 4 so that the beginning of each vertical scan is made to start at the proper point as respects a frame height on the moving picture strip, the present invention provides the rectangular wave generator 32 a more detailed circuit of which is disclosed in Fig. 3.

Figure 3:
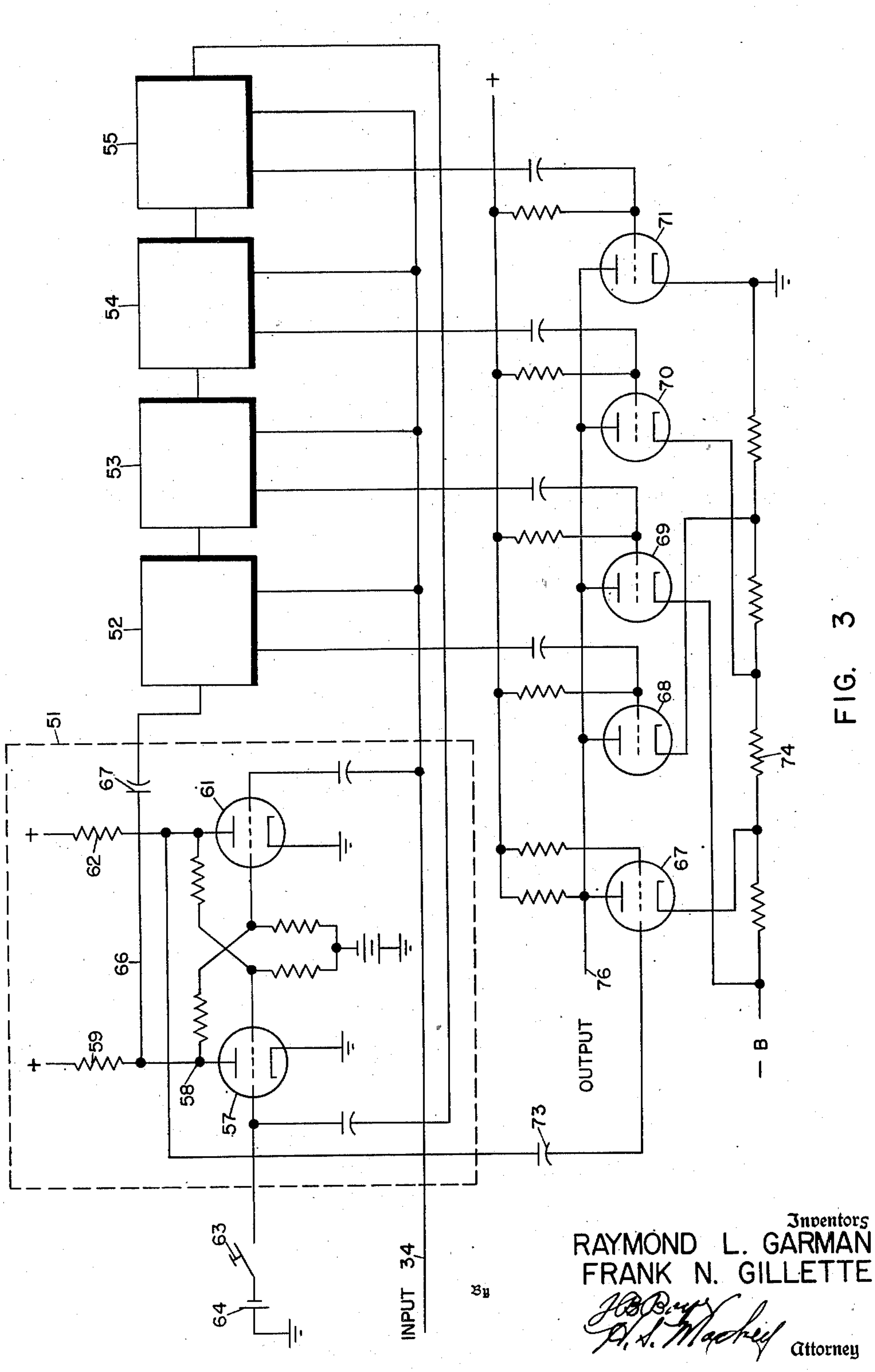
Fig. 3 is a diagrammatic view of the rectangular wave generator used in the system of this invention.

Referring now to Fig. 3 the vertical synchronization pulses are transmitted from the receiver 19 to the rectangular wave generator 32 by conductor 34. These pulses are applied to the grids of the second tubes of a series of five Eccles-Jordan trigger circuits. In the showing of Fig. 3 the first of such trigger circuits, enclosed by the dotted rectangle 51, is illustrated diagrammatically, and, for the purposes of simplification the remainder of the series of five trigger circuits, are shown merely as blocks 52 to 55 inclusive, since they are in all respects duplicates of the first such circuit.

As is well known a trigger circuit of this type functions by virtue of the fact that only one tube at a time is made conducting, the other tube being at the same time rendered non-conductive. Assume for example that the tubes 57 are conductive and that a negative pulse is applied to the grid thereof. This negative pulse causes the plate current to decrease which in turn results in an increase in potential of point 58 by reason of the reduced potential drop in resistor 59. Since the grid of the second tube 61 is connected to terminal 58, the negative potential on the grid of this tube decreases causing an increase in the plate current thereof. This increase in plate current in turn causes an increased potential drop in plate resistor 62 and the grid of tube 57 is driven more negative by reason of the intercoupling between the tubes. The action of the circuit is therefore seen to be cumulative allowing only one tube to conduct at a time. Of course, if a negative pulse is applied to the grid of a tube which is already in a non-conductive state no change in the relative conductivity of the tubes takes place.

While the synchronization pulses are applied to the grids of the second tubes of each trigger circuit, only those trigger circuits will be actuated in which the second tube was conducting at the time the pulse was transmitted and hence triggering pulses may be obtained only from particular trigger circuits at each successive synchronization pulse.

Advantage of this phenomena is taken to provide a ring counter circuit which completes a cycle for each group of five synchronization pulses and which causes each trigger circuit to generate triggering pulses in sequence. The output of the first tube of each triggering circuit is connected to the grid of the first tube of the next succeeding triggering circuit, the output of the first tube of the last of the series being connected back to the grid of the first tube of the first circuit to form a ring circuit. By this means when any one of the triggering circuits is actuated by a synchronizing pulse applied to the grid of the second tube a pulse is generated by that trigger circuit which actuates the next succeeding triggering circuit causing the relative conductivity of its tubes to be reversed.

In operation the triggering circuits are initially set so that the first tube of each is conductive and hence the second tube in each case is in a non-conductive condition. A short negative impulse is then applied to the grid of the first tube of the first trigger circuit by a momentary actuation of switch 63 thus applying a negative potential from the source 64. This causes the conditions in the first trigger circuit to be reversed and the first tube of this circuit is now made non-conductive and the second tube conductive. When a synchronizing pulse is impressed on the conductor 34 and hence on the grids of the second tubes of each of the trigger circuits, the first trigger circuit only is actuated since in this circuit only is the second tube conducting. This circuit is again actuated, a reversal of the relative conductivity of the tubes again takes place and a pulse is generated by this circuit. The negative pulse generated by this actuation of the trigger circuit 51 is applied to the grid of the first tube of triggering circuit 52 thru conductor 66 and condenser 67. Since the first tube of circuit 52 is conductive this negative pulse will actuate trigger circuit 52 and its conditions of conductivity will be reversed, the first tube being rendered non-conductive and the second tube conductive. When the next synchronizing pulse is transmitted over conductor 34, therefore, the second trigger circuit 52 only will be actuated since this is the only trigger circuit whose second tube is conductive and hence the only one capable of actuation by a negative pulse applied to the inputs of the second tube of each trigger circuit. Actuation of circuit 52 by the synchronizing pulse causes this trigger circuit to generate a pulse and in turn to condition circuit 53 for actuation by the next succeeding synchronizing pulse in the same manner as before. This action continues thru the succeeding circuits and triggering pulses are generated by each in sequence at the arrival of each successive synchronizing pulse.

Positive pulses are derived from each triggering circuit when they are in turn actuated by a synchronizing pulse so as to change the second tube from the conductive to the non-conductive state and these positive pulses are applied to the input electrodes of tubes 67 to 71 inclusive. As shown specifically with respect to trigger circuit 51 the positive pulse is obtained by connecting the grid of tube 67 thru condenser 73 to the anode of tube 61. The remaining tubes 68 to 71 inclusive are similarly respectively connected to trigger circuits 52 to 55 inclusive.

The cathodes of tubes 67 to 71 inclusive are connected to different potential points on the voltage divider 74 so that as each tube is in turn rendered conductive by the application of the successive positive pulses obtained from sequential trigger circuits 51 to 55 inclusive, the common output conductor 76 is brought to the proper potential level as indicated by the wave form of Fig. 4.

While triodes have been illustrated as the means for adjusting the output conductor 76 to the successive voltage levels desired, it is also contemplated that diodes may be used to obtain a more uniform action. Likewise it is readily apparent that appropriate amplifying means may be connected between the trigger generators 51 to 55 inclusive should amplification be deemed desirable.

Figure 5:
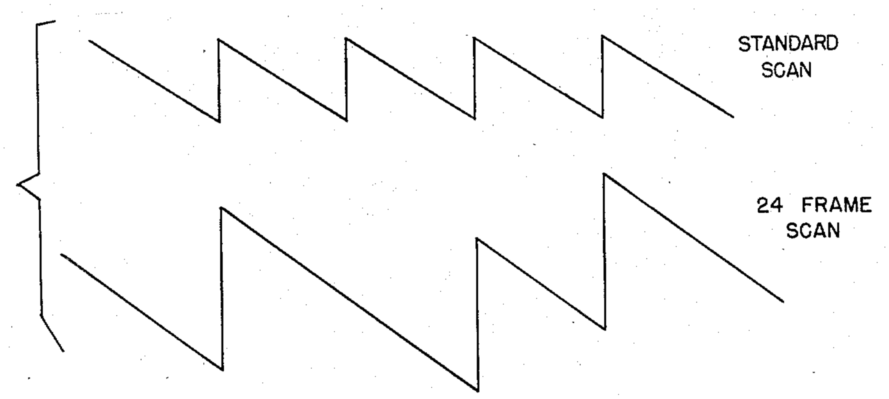
Fig. 5 is a diagram illustrating the form of the wave applied to the vertical deflecting means of the cathode ray tube as compared to the standard wave form used for vertical television scanning.

Reverting now to Fig. 1 the cyclically varying voltage wave generated by the rectangular wave generator 32 in the manner just described is mixed with the compressed saw-tooth wave generated by the vertical sweep generator 29 in a mixer and vertical driver 36. The mixing of these two waves is one of simple voltage addition and the resultant wave form obtained is illustrated at 7 in Fig. 5 where it may be visually compared with the standard vertical scan normally used for television illustrated by the wave form 8.

The vertical deflection on the cathode ray tube 12 has now been adjusted so that the relative motion between the vertical sweep and the continuous movement of the picture strip has been effectively canceled, however, it must also be assured that the picture frames are placed on the film strip in proper relation to the sprocket holes of the film and that such placement be maintained with considerable accuracy.

In the embodiment described, herein, the film is advanced by a synchronous motor 24 which derives its power from the vertical synchronizing signals which are amplified and converted to a sine wave of the proper power by means of amplifier 37. If the energy supplied to the motor were at all times in exactly the correct phase relation to the synchronizing signals, by proper gearing the film would be advanced at the proper rate and in the proper frame relation at all times.

Such absolute phase relation between the synchronizing signals and the energy powering the motor 24 is not achievable in any practical system and therefore a phase shifter 38 operated by a phase control 39 is provided so that the phase of the energy powering motor 24 may be adjusted from time to time as the occasion warrants.

Before the phase can be properly adjusted, however, the exact time at which certain points on the film strip 14 reach the critical locations which are suitable for the leading edges of the various frames which are to be photographed thereon, must be known. The critical locations in this case being those positions which have been selected as the starting points of the various vertical sweeps occurring in the previously described recurring cycle of five.

In the present invention in order that such information shall constantly be available in a clear and exact form the phase and frequency match monitor 41 is provided.

Figure 7:
Fig. 7 is a diagram illustrating the form of the wave generated by the electro mechanical pulse generators.

This monitor comprises a cathode ray tube the driving system of which is coupled to a 36 cycle generator in such a manner that a basic circular sweep is obtained. Additionally the basic circular sweep is deflected radially at frequencies of 60 and 24 cycles per second by electro-mechanical pulse generators connected to the motor 24 and to the film drive 28 respectively. These generators may preferably consist of a rotating arm of magnetic material which once each period of revolution pass thru the magnetic field of a small coil, thereby changing the magnetic properties of the coil in such a fashion that a voltage signal is produced. By proper design of the magnetic arm and cooperating coil a wave form such as depicted in Fig. 7 may be produced.

In Fig. 1 the electro-mechanical wave generator for producing the 60 cycle impulses is shown as consisting of the magnetic arm 42 geared to the motor 24 so that it passes thru the magnetic field of the coil 43 60 times a second. In a similar manner the magnetic arm 44 connected to the driving sprocket 28 by shaft 46 is made to pass thru the magnetic field of coil 47 24 times a second, thereby generating impulses having a frequency of 24 cycles per second.

Figure 6:
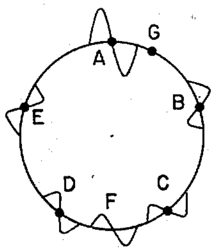
Fig. 6 is a diagram illustrating the pattern produced on the screen of the phase and frequency match monitor tube.

These separate impulses are applied to the deflection means of the phase monitor tube 41 producing a pattern on the face thereof as indicated in Fig. 6. The 60 cycle impulses appear as the deflections indicated at A, B, C, D and E and the 24 cycle impulses appear as the deflections indicated at A and F. The deflection indicated at A, since it represents the sum of the 60 and 24 cycle impulses, has a greater amplitude than the others and therefore serves to indicate the beginning of a recording cycle in so far as the film motion is concerned.

In addition to the radial deflections of the cathode ray trace on the phase monitor tube, which deflections are indicative of film strip position, intensity modulation signals are applied thereto to indicate the time relationship of the beginning of each television scan. Vertical synchronizing signals derived from the receiver 10 are applied thru conductors 34 and 48 to the intensifying electrodes of the phase monitor tube 41. These intensity modulation signals appear as bright spots which are indicated in Fig. 6 as occurring at the intersection of the radial deflections and the basic circular trace. The system is so adjusted that when these bright spots appear at these points it is known that each television scan is starting just as the leading edge of a film frame reaches one of the critical locations. Any error in phase between the television scan and film placement will be indicated by the bright spots leaving the intersection points and travelling up the steep curve of the radial deflections. There is, therefore, provided a sensitive and clearly recognizable indicator for the adjustment of the phase shifter.

So much of the system indicates that the leading edge of a film frame has reached one of the critical locations of the cathode ray scan, it is not known, however, that the leading edge of the film frame has reached that particular one of the critical locations which corresponds to the position of the trace that exists at that instant of time, that is, that the leading edge of film frame and the generator of rectangular waves 32 are in proper cyclic relation to each other. This is determined by obtaining an impulse from the actuation of trigger generator 51 (see Fig. 3) delaying it slightly by any suitable delay means and utilizing the delayed impulse to intensify the cathode trace of the phase monitor tube 41. This intensification signal is indicated by the point G on Fig. 6. When it follows the radial deflection A, which is easily determinable since it has the greater amplitude, correct operation is indicated. When, however, the spot G, follows any of the other radial deflections, it is indicated that the system is out of phase by some whole number of television scans.

To correct such a gross error the cycle jumper 49 is provided. This may preferably consist of a simple trigger generator actuated by a push-button so connected that each time the push-button is actuated an extra impulse is applied to the inputs of the trigger generators 51 to 55 inclusive. This results in the output of the rectangular wave generator being advanced one step for each actuation of the push-button and a maximum of four such actuations may be required if, for example, the bright spot G should be shown as following deflection B rather than deflection A.

While in the above disclosure the power for the motor 24 has been described as obtained by amplification of the synchronizing signals, it is obvious that other sources may be used with equal efficacy. For example, if the television transmitter is operated from the same alternating current lines as the receiver, these lines themselves may be used as the source of power, or a reference signal may be transmitted from the transmitting to the receiving stations over lines leased for this purpose and this signal amplified and used as a source of power. In any case, of course, the phase shifter 38 and monitor 41 are necessary at all times to insure proper phase relation between the film strip motion and the received television signals.

Figure 2:
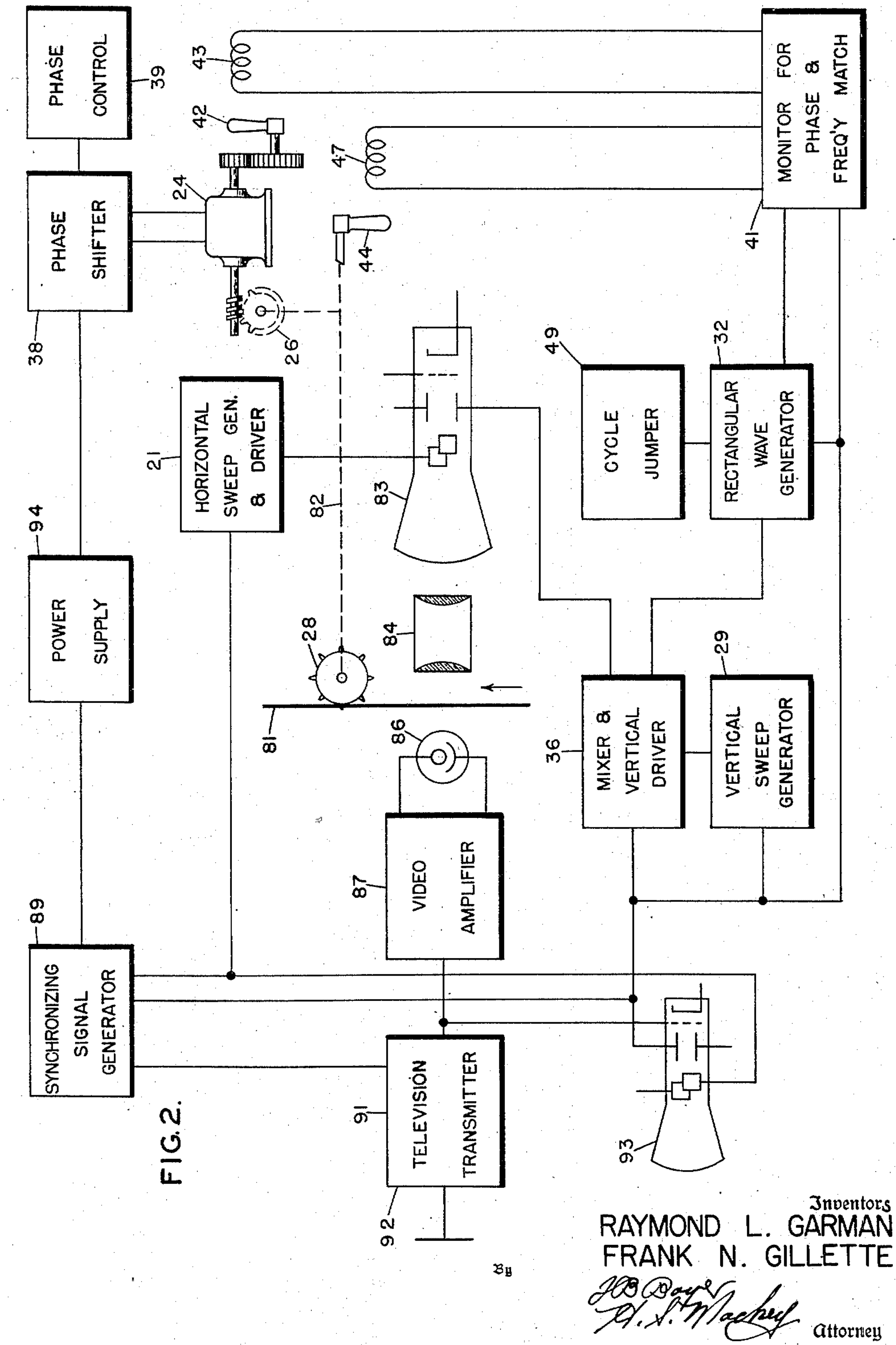
Fig. 2 is a diagrammatic view of a complete system for translating motion picture images to television signals.

In Fig. 2 there is disclosed a similar system for converting standard motion picture images to television signals.

This system incorporates many of the identical elements previously described in connection with the system of Fig. 1 and identical reference characters are therefore used to denote identical units.

In this system a motion picture strip 81 having photographic images thereon is continuously advanced in an upward direction thru the medium of driving sprocket 28, shaft 82, worm gear 26 and synchronous motor 24. A spot of light generated by the cathode ray tube 83 is projected thru the lens system 84 and film strip 81 onto a photoelectric device 86 which converts the varying light intensities so projected to electrical variations which variations are in turn amplified by the video amplifier 87 to form the video signal. These video signals are combined with synchronizing signals produced by a conventional synchronizing signal generator 89 in a television transmitter 91 and the composite signal radiated by means of a transmitting antenna 92. As a check on the quality of the picture transmitted a monitor picture tube 93 is connected in the usual manner to convert the video signals to picture images.

The cathode ray tube 83, which constitutes the light source for scanning the picture images appearing on the picture strip 81, has a very rapid decay time so that at any instant of time the light projected on the photoelectric device 86 is only that represented by the position of the scanning spot at that instant.

In order that the scanning spot may be moved over the screen of the cathode ray tube 83, to cancel the motion of the film to insure conversion of picture frames occurring at the rate of 24 frames a second to television signals recurring at a frequency of 60 per second and to provide for proper framing at all times, a compressed vertical sweep generated by vertical sweep generator 29 is mixed in the vertical mixer and driver 36 with a rectangular wave generated by the wave generator 32 and applied to the vertical deflection means of the tube 83.

The vertical sweep generator 29, mixer and driver 36 and rectangular wave generator 32 are identical to the same units described in connection with the system of Fig. 1 and their mode of operation is the same except that inasmuch as in converting photographic images to television video signals it is not desirable or necessary to omit any of the light scans of the picture strip, the blanking mixer 33 of Fig. 1 is not used to block the tube during every fifth scan. Instead, every other picture frame on the film strip 81 is scanned three times, while the alternate frames are scanned twice, thus providing the proper ratio of 24 to 60 for converting standard motion pictures frequencies to standard television frequencies.

As in the case of the system of Fig. 1 phase control for the continuous movement of the picture strip is accomplished by a phase shifter 38 connected in the motor power supply circuit and monitoring is had by an identical phase and frequency monitor 41.

The motor 24 may derive its power thru the phase shifter 38 from any of the sources referred to in connection with the system of Fig. 1 but since both the motor 24 and synchronizing signal generator 89 are located in the same vicinity both units may advantageously derive their power from the same alternating current supply source 94.

Figure 8:
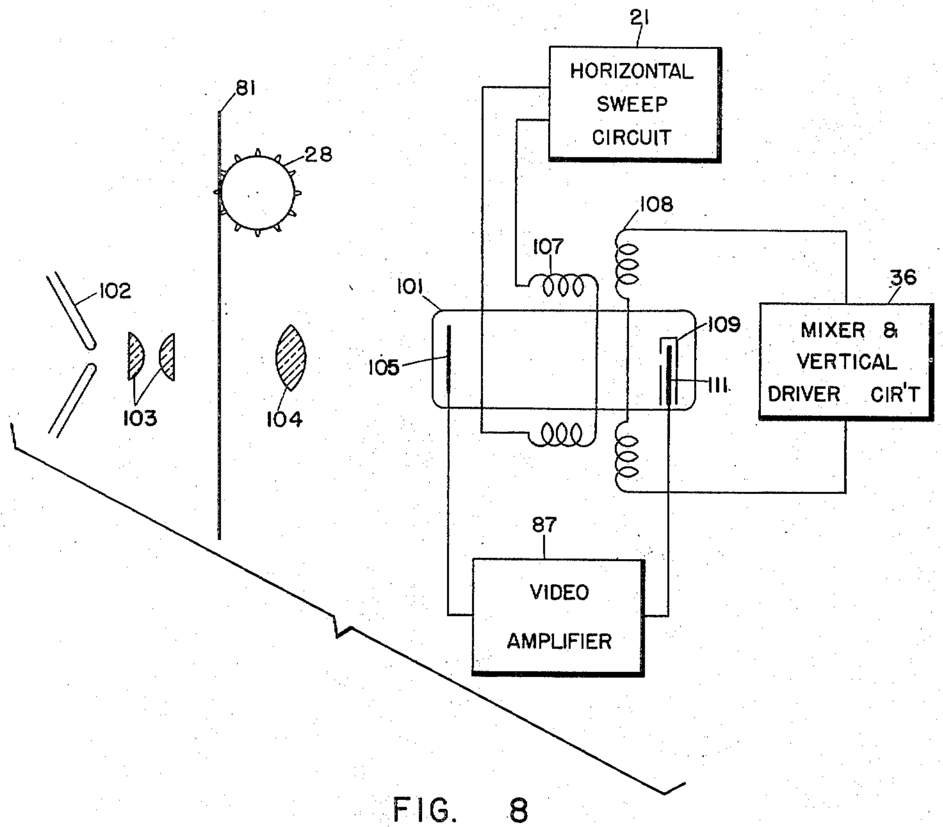
Fig. 8 is a diagrammatic view of a modified form of a portion of the invention.

As an alternative to the cathode ray tube light source 83 and photoelectric device 86 for scanning the picture strip and converting the images appearing thereon to video signals, the apparatus disclosed in Fig. 8 may be utilized with equal effect.

In this system a dissector tube 101 of the type shown and described in the patent to Farnsworth No. 1,773,980, issued August 26, 1930, constitutes the picture scanning means.

The picture strip 81 is uniformly illuminated by light from an arc source 102 and lens system 103. A projection lens diagrammatically represented by the element 104 projects the image of the film on the photocathode 105 of the dissector tube 101. The electrons emitted from each elemental area of the cathode correspond in electrical intensity with the intensity of the light falling on that area and hence an electrical image corresponding to the light image is formed. This electrical image is scanned in both horizontal and vertical directions by the deflecting means 107 and 108 driven by horizontal and vertical drivers 21 and 36 identical to and operating in the same manner as those described in connection with the circuits of Figs. 1 and 2. The anode 111 of the dissector tube 101 is shielded by a shield 109 having a small aperture therein which permits only a small elemental area of the electrical image to be received by the anode at any instant of time. By deflecting the electrical image over the shield aperture and hence the anode the whole electrical image may be scanned in a line for line manner and the electrical signals so produced amplified by the video amplifier 87 in the same manner as the electrical currents derived from the photoelectric device 86 in the system of Fig. 2.

What is claimed is:

1. In a device of the character described, a film strip adapted to have film frames thereon, means for moving said film strip at a constant speed past a projection area, means for scanning at least a portion of said projection area in a line for line manner comprising a first deflection means for scanning said film strip transversely thereof producing a transverse line of scan of elemental width and a second deflection means for progressively advancing said transverse line of scan longitudinally of the film strip and periodically returning said line of scan to an initial plane of transverse scan, means for cyclically varying the position of the initial plane of transverse scan to compensate for the continuous motion of said film relative to said scanning means and means controlled in accordance with the relative positions of said initial line of transverse scan and the film strip for indicating the phase relationship between said scanning means and said film moving means.

2. In a device of the character described, a film strip adapted to have film frames thereon, synchronous motor means for moving said film strip at a constant speed past a projection area, means for scanning at least a portion of said projection area in a line for line manner comprising a first deflection means for scanning said film strip transversely thereof producing a transverse line of scan of elemental width and a second deflection means for progressively advancing said transverse line of scan longitudinally of the film strip and periodically returning said line of scan to an initial plane of transverse scan, means for cyclically varying the position of the initial plane of transverse scan to compensate for the continuous motion of said film relative to said scanning means, indicating means controlled in accordance with the relative positions of said initial plane of transverse scan and the film strip for indicating the phase relationship between said scanning means and said synchronous motor means, a phase shifter connected to said synchronous motor to vary the phase of the energy supplied thereto and phase control means connected to said phase shifter and operable in accordance with said indicating means to maintain proper phase relation between said scanning means and said synchronous motor means.

3. In a device of the character described, a film strip adapted to have film frames thereon, means for moving said film strip at a constant speed past a projection area, a cathode ray tube developing a cathode ray beam for scanning at least a portion of said projection area in a line for line manner, a first deflection means for causing said cathode ray beam to scan said film strip transversely thereof producing a transverse line of scan of elemental width, a second deflection means for causing said cathode ray beam progressively to advance said transverse line of scan longitudinally of the film strip and periodically to return said line of scan to an initial plane of transverse scan, means cooperating with said second deflection means for cyclically varying the position of the initial plane of transverse scan to compensate for the continuous motion of said film strip relative to said cathode ray beam and means controlled in accordance with the relative positions of said cathode ray beam and said film strip for indicating the phase relationship between the cathode ray beam and said film moving means.

4. In a device of the character described, a film strip adapted to have film frames thereon, a synchronous motor means for moving said film strip at a constant speed past a projection area, a cathode ray tube developing a cathode ray beam for scanning at least a portion of said projection area in a line for line manner, a first deflection means for causing said cathode ray beam to scan said film strip transversely thereof producing a transverse line of scan of elemental width, a second deflection means for causing said cathode ray beam progressively to advance said transverse line of scan longitudinally of the film strip and periodically to return said line of scan to an initial plane of transverse scan, means cooperating with said second deflection means for cyclically varying the position of the initial plane of transverse scan to compensate for the continuous motion of said film strip relative to said cathode ray beam, indicating means controlled in accordance with the relative positions of said cathode ray beam and said film strip for indicating the phase relationship between the cathode ray beam and said synchronous motor means, a phase shifter connected to said synchronous motor to vary the phase of the energy supplied thereto and phase control means connected to said phase shifter and operable in accordance with said indicating means to maintain proper phase relationship between said cathode ray beam and said synchronous motor means.

5. In an apparatus for photographically recording television images, means for receiving a television signal consisting of video signals and synchronizing signals, a cathode ray tube for developing a cathode ray beam, means for varying the intensity of said cathode ray beam as a function of said video signals, horizontal deflection means and vertical deflection means for said cathode ray beam operative in accordance with said synchronizing signals whereby successive picture images are scanned on the screen of said cathode ray tube, a film strip, means for moving said film strip at a constant speed, projection means for projecting the image formed on said cathode ray tube screen on said constantly moving film strip, means for cyclically varying the position of the successive picture images on the screen of said cathode ray tube and means operative by said film moving means and said synchronizing signals for determining the phase relationship between said vertical deflection means and said film moving means.

6. In an apparatus for photographically recording television images, means for receiving a television signal consisting of video signals and synchronizing signals, a cathode ray tube for developing a cathode ray beam, means for varying the intensity of said cathode ray beam as a function of said video signals, horizontal deflection means and vertical deflection means for said cathode ray beam operative in accordance with said synchronizing signals whereby successive picture images are scanned on the screen of said cathode ray tube, a film strip, means for moving said film strip at a constant speed, projection means for projecting the image formed on said cathode ray tube screen on said constantly moving film strip, a rectangular wave generator operated by said synchronizing signals to produce a wave whose amplitude varies cyclically in synchronism with successive television images, and means for applying the wave so generated to said vertical deflection means whereby the position of successive television scans on said cathode ray tube screen is varied to compensate for the continuous motion of said film strip relative to said cathode ray tube screen.

7. In an apparatus for photographically recording television images, means for receiving a television signal consisting of video signals and synchronizing signals, a cathode ray tube for developing a cathode ray beam, means for varying the intensity of said cathode ray beam as a function of said video signals, horizontal deflection means and vertical deflection means for said cathode ray beam operative in accordance with said synchronizing signals whereby successive picture images are scanned on the screen of said cathode ray tube, a film strip, means for moving said film strip at a constant speed, projection means for projecting the image formed on said cathode ray screen on said constantly moving film strip, a rectangular wave generator operated by said synchronizing signals to produce a wave whose amplitude varies cyclically in synchronism with successive television images, means for applying the wave so generated to said vertical deflection means to vary the position of successive television scans on said cathode ray tube screen to compensate for the continuous motion of said film strip relative to said cathode ray screen and indicating means operative conjointly by said synchronizing signals and said film moving means to indicate the phase relationship between successive television scans and said film moving means.

8. An apparatus according to claim 7 in which the indicating means comprises a cathode ray tube having beam intensifying electrodes and beam deflection means, means for impressing impulses derived from the synchronizing signals on said intensifying electrodes and means for impressing a voltage wave derived from said film moving means to said deflection means.

9. In an apparatus for photographically recording television images, means for receiving a television signal consisting of video signals and synchronizing signals, a cathode ray tube for developing a cathode ray beam, means for varying the intensity of said cathode ray beam as a function of said video signals, horizontal deflection means and vertical deflection means for said cathode ray beam operative in accordance with said synchronizing signals whereby successive picture images are scanned on the screen of said cathode ray tube at a first frequency of repetition, a film strip, means for moving said film strip at a constant speed, projection means projecting the image formed on said cathode ray screen on said constantly moving film strip, a plurality of trigger circuits connected to form a ring counter circuit, connections for applying a train of operating pulses derived from said synchronizing signals to each of said trigger circuits whereby said trigger circuits successively and cyclically generate impulses at said first frequency of repetition, a voltage source, an output terminal therefor, means operative by said cyclically generated impulses for cyclically varying the potential of said output terminal, a connection from said output terminal to said vertical deflection means whereby the position of successive television fields on the screen of said cathode ray tube is cyclically varied and the images projected on said constantly moving film strip are photographically recorded as separate film frames having a second repetition frequency.

10. An apparatus according to claim 9 having an indicating means operative conjointly by said synchronizing signals and signals generated by said film moving means to indicate the phase relationship between successive television fields at the first repetition frequency and the recorded film frames at the second repetition frequency.

11. In an apparatus according to claim 9, an indicating means comprising a cathode ray tube having beam intensifying electrodes and beam deflection means, a first voltage generator connected to said film moving means generating voltage pulses at said first repetition frequency, a second voltage generator connected to said film moving means generating voltage pulses at said second repetition frequency, connections from said first and second voltage generators to said deflection means and means for impressing pulses derived from said synchronizing signals on said beam intensifying electrodes.

12. In an apparatus according to claim 11, means for deriving a pulse from the first trigger circuit of said plurality of trigger circuits, a delay circuit therefor, and connections for impressing said delayed pulse on the intensifying electrodes of said cathode ray tube indicating means.

13. In an apparatus according to claim 12, means for deriving a pulse from the last trigger circuit of said plurality of trigger circuits, connections for impressing said pulse on the intensifying electrodes of said first mentioned cathode ray tube for blanking the tube during the period of one of the television scans.

14. In an apparatus for the production of television signals from motion picture film having separate image frames thereon, means for moving said film at a constant speed past a projection area, a cathode ray tube having means for developing a cathode ray beam to produce a spot of light of elemental area, optical means to direct the spot of light so produced thru the film to a photoelectric device which produces when so illuminated varying electrical energy corresponding to the film density at the point of illumination, deflection means associated with said cathode ray tube for causing said spot of light to scan film transversely thereof producing a transverse line of scan of elemental width, a second deflection means associated with said cathode ray tube to progressively advance said transverse line of scan longitudinally of the film and periodically to return said line of scan to an initial plane of transverse scan, means cooperating with said second deflection means for cyclically varying the position of the initial plane of transverse scan to compensate for the motion of said film strip relative to said cathode ray tube, and means controlled in accordance with the relative positions of said cathode ray beam and said film strip for indicating the phase relationship between the cathode ray scanning means and the film moving means.

15. In an apparatus for the production of television signals from motion picture film having separate image frames thereon, means for moving said film at a constant speed, a cathode ray tube having means for developing a cathode ray beam to produce a spot of light of elemental area, an optical system directing the light so produced thru the film to a photoelectric device which when illuminated produces varying electrical energy corresponding to the film density at the point of illumination, a generator of synchronizing signals, horizontal deflection means and vertical deflection means for said cathode ray tube operative in accordance with said synchronizing signals whereby the beam developed by said cathode ray tube is caused to scan an image area of said film, a rectangular wave generator operated by said synchronizing signals to produce a voltage wave whose amplitude varies cyclically in synchronism with successive cathode ray tube scans, an connections for applying the voltage wave so generated to said vertical deflection means whereby the initial position of successive cathode ray tube scans is varied to compensate for the continuous motion of the film.

16. An apparatus according to claim 15 having an indicating means operative conjointly by said synchronizing signals and signals generated by said film moving means to indicate the phase relationship between successive cathode ray tube scans at a first repetition frequency and the movement of said film frames at a second repetition frequency.

RAYMOND L. GARMAN.
FRANK N. GILLETTE.

REFERENCES CITED

The following references are of record in the file of this patent:

UNITED STATES PATENTS

| Number | Name | Date |
|---|---|---|
| 2,189,351 | Schroter | Feb. 6, 1940 |
| 2,219,120 | Somers | Oct. 22, 1940 |
| 2,248,552 | Schlesinger | July 8, 1941 |
| 2,248,559 | Schlesinger | July 8, 1941 |
| 2,251,786 | Epstein | Aug. 5, 1941 |
| 2,261,848 | Goldmark | Nov. 4, 1941 |
| 2,275,898 | Goldsmith | Mar. 10, 1942 |
| 2,287,033 | Goldmark | June 23, 1942 |
| 2,373,114 | Goldsmith | Apr. 10, 1945 |
| 2,404,839 | Hammond | July 30, 1946 |
| 2,455,323 | Townsend | Nov. 30, 1948 |